(12) United States Patent
Sumino et al.

(10) Patent No.: US 8,833,206 B2
(45) Date of Patent: Sep. 16, 2014

(54) WIRE SHEATH STRIPPING MACHINE

(75) Inventors: Yuko Sumino, Tokoname (JP); Minoru Fukui, Handa (JP)

(73) Assignee: Denso Corporation, Kariya (JP)

( * ) Notice: Subject to any disclaimer, the term of this patent is extended or adjusted under 35 U.S.C. 154(b) by 268 days.

(21) Appl. No.: 13/447,665

(22) Filed: Apr. 16, 2012

(65) Prior Publication Data

US 2013/0269487 A1    Oct. 17, 2013

(51) Int. Cl.
*H01K 1/12* (2006.01)

(52) U.S. Cl.
USPC .......................................................... 81/9.51

(58) Field of Classification Search
CPC ................................... H02G 1/1265
USPC ......................................... 81/9.51, 9.41, 9.42
See application file for complete search history.

(56) References Cited

U.S. PATENT DOCUMENTS

| | | | | |
|---|---|---|---|---|
| 7,597,030 B2 * | 10/2009 | Stepan et al. | .................. | 81/9.51 |
| 8,402,862 B2 * | 3/2013 | Ji | .................................. | 81/9.51 |
| 8,578,820 B2 * | 11/2013 | Wirth | .............................. | 81/9.4 |

FOREIGN PATENT DOCUMENTS

| | | |
|---|---|---|
| JP | A-08-065848 | 3/1996 |
| JP | A-10-174239 | 6/1998 |
| JP | A-2005-065372 | 3/2005 |
| JP | A-2008-537458 | 9/2008 |
| WO | WO 2006/100590 A1 | 9/2006 |

OTHER PUBLICATIONS

Japanese Office Action issued in Application No. 2010-237145; Dated Nov. 6, 2012 (With Translation).
Chinese Office Action issued in Application No. 201110322580.2 mailed Nov. 15, 2013 (with English Translation).

* cited by examiner

*Primary Examiner* — David B Thomas
(74) *Attorney, Agent, or Firm* — Oliff PLC (57) ABSTRACT

A wire sheath stripping machine having at least one cutter for cutting an outer circumference of a wire, a cutter rotating means for rotating the cutter in a circumferential direction of the wire, a cutter driving means for advancing and retracting the cutter in a radial direction of the wire, and at least one wire support arranged at a position facing the cutter across the wire to receive the outer circumference of the wire.

5 Claims, 7 Drawing Sheets

① LOAD WIRE (a)

(b)

② CLAMP WIRE (c)

(d)

③ STRIP
(ADVANCE CUTTER)

(e)

(f)

④ RETRACT CUTTER
UNCLAMP WIRE AND
DISCHARGE (LOAD)

(g)

(h)

WIRE SHEATH STRIPPING MACHINE

TECHNICAL FIELD

The present invention relates to a wire sheath stripping machine which strips the sheath off of a wire.

BACKGROUND ART

This type of wire sheath stripping machine is described in Japanese Patent Publication (A) No. 8-65848. In this prior art, the outer circumference of the wire is cut by cutters so as to strip off the sheath from the wire. Specifically, three cutters are arranged in the circumferential direction at equal intervals and the three cutters are made to advance toward the center of the wire while making them rotate coaxially with the wire so as to thereby cut into the outer circumference of the wire.

SUMMARY OF INVENTION

However, if based on the above prior art, there is the problem that trouble such as uneven stripping or incomplete stripping easily occur.

Here, "uneven stripping" is the problem when, at the time of stripping, a bending load is applied from a cutter to the wire whereby the stripped wire does not become a predetermined diameter or the variation in diameter becomes greater.

"Incomplete stripping" is the problem when, at the time of the stripping, a bending load is applied from the cutter to the wire, the wire becomes off centered, and the sheath ends up partially remaining. Further, when the wire is fed off-centered as well, the three cutters are not struck evenly, so incomplete stripping occurs.

The present invention, in view of the above problems, has as its object the provision of a wire sheath stripping machine which can suppress uneven stripping or incomplete stripping.

To achieve the above object, the present invention provides a wire sheath stripping machine comprising:

at least one cutter (211) for cutting an outer circumference of a wire (1);

a cutter rotating means for rotating the cutter (211) in a circumferential direction of the wire (1);

a cutter driving means (22) for advancing and retracting the cutter (211) in a radial direction of the wire (1); and at least one wire support (212) arranged at a position which faces the cutter (211) across the wire (1) to receive the outer circumference of the wire (1).

According to this, the wire support (212) receives the outer circumference of the wire (1) at the side opposite to the cutter (211), so can keep a bending load from being applied from the cutter (211) to the wire (1) at the time of stripping and can keep the wire (1) from becoming off centered. For this reason, it is possible to suppress uneven stripping or incomplete stripping.

In the present invention, the wire support (212) may be coupled with the cutter driving means (22) so as to advance and retract in the radial direction of the wire (1) while linked with the cutter (211).

Due to this, the configuration can be simplified compared with the case of providing a driving means dedicated to advancing and retracting the wire support (212).

In the present invention, the wire sheath stripping machine may further comprise a clamp mechanism (11, 12) for clamping the wire (1), and the cutter driving means (22) may have a link mechanism (221) configured so that the cutter (211) and wire support (212) advance and retract in the radial direction of the wire (1) while linked with the clamping/unclamping operation of the clamp mechanism (11, 12).

Due to this, the clamping/unclamping operation of the wire (1) and the advancing and retracting operation of the cutter (211) and wire support (212) may be performed simultaneously, so the working time can be shortened.

In the present invention, the wire sheath stripping machine may comprise at least one cutter head (213) to which the cutter (211) and wire support (212) are affixed, wherein the cutter (211) and wire support (212) may be coupled with the cutter driving means (22) through the cutter head (213).

In the present invention, the wire sheath stripping machine may comprise pluralities of the cutters (211), wire supports (212), and cutter heads (213) of the same number, wherein each cutter head (213) has one cutter (211) and wire support (212) each fixed to it.

In the present invention, each wire support (212) may face, across the wire (1), one of the cutters (211) which is fixed to one of the cutter heads (213) which is different from the cutter head (213) to which it itself is fixed.

In the present invention, the cutters (211) are a first cutter (211A), a second cutter (211B), and a third cutter (211C), the wire supports (212) are a first wire support (212A), a second wire support (212B), and a third wire support (212C)

the cutter heads (213) are a first cutter head (213A), a second cutter head (213B), and a third cutter head (213C), the first cutter head (213A) has the first cutter (211A) and the first wire support (212A) fixed to it, the second cutter head (213B) has the second cutter (211B) and the second wire support (212B) fixed to it, the third cutter head (213C) has the third cutter (211C) and the third wire support (212C) fixed to it, the first wire support (212A) is arranged between the first cutter (211A) and the second cutter (211B) so as to face the third cutter (211C), the second wire support (212B) is arranged between the second cutter (211b) and the third cutter (211C) so as to face the first cutter (211a), and the third wire support (212C) is arranged between the third cutter (211C) and the first cutter (211A) so as to face the second cutter (211B).

In the present invention, the width dimension of a cutting edge (211a) of the cutter (211) is the same as a stripping width (Ws) of the wire (1).

Due to this, it is possible to strip wire without moving the cutter (211) in the longitudinal direction of the wire (1), so it is possible to shorten the working time.

The reference numerals in parentheses after the various means described in this section show the correspondence with specific means which are described in the later explained embodiments.

DESCRIPTION OF EMBODIMENTS

Below, an embodiment of the present invention will be explained. As a specific example of the wire which is stripped by the wire sheath stripping machine of the present embodiment, φ2 mm or so enamel coated copper wire which is used as a coil of an armature of a starter motor may be mentioned.

Figure 1:
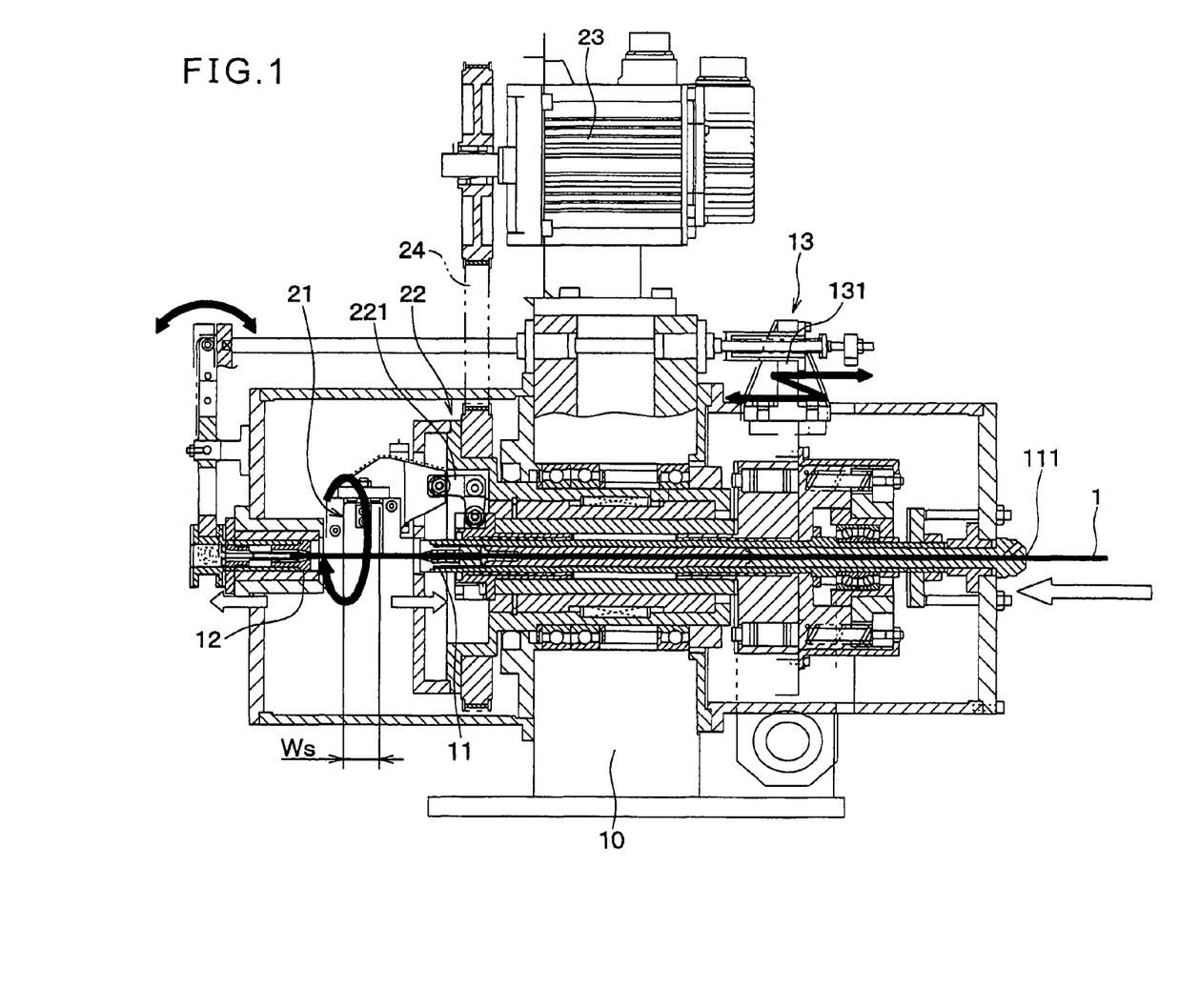
FIG. 1 is a front view of a wire stripping machine according to an embodiment of the present invention.
Figure 2:
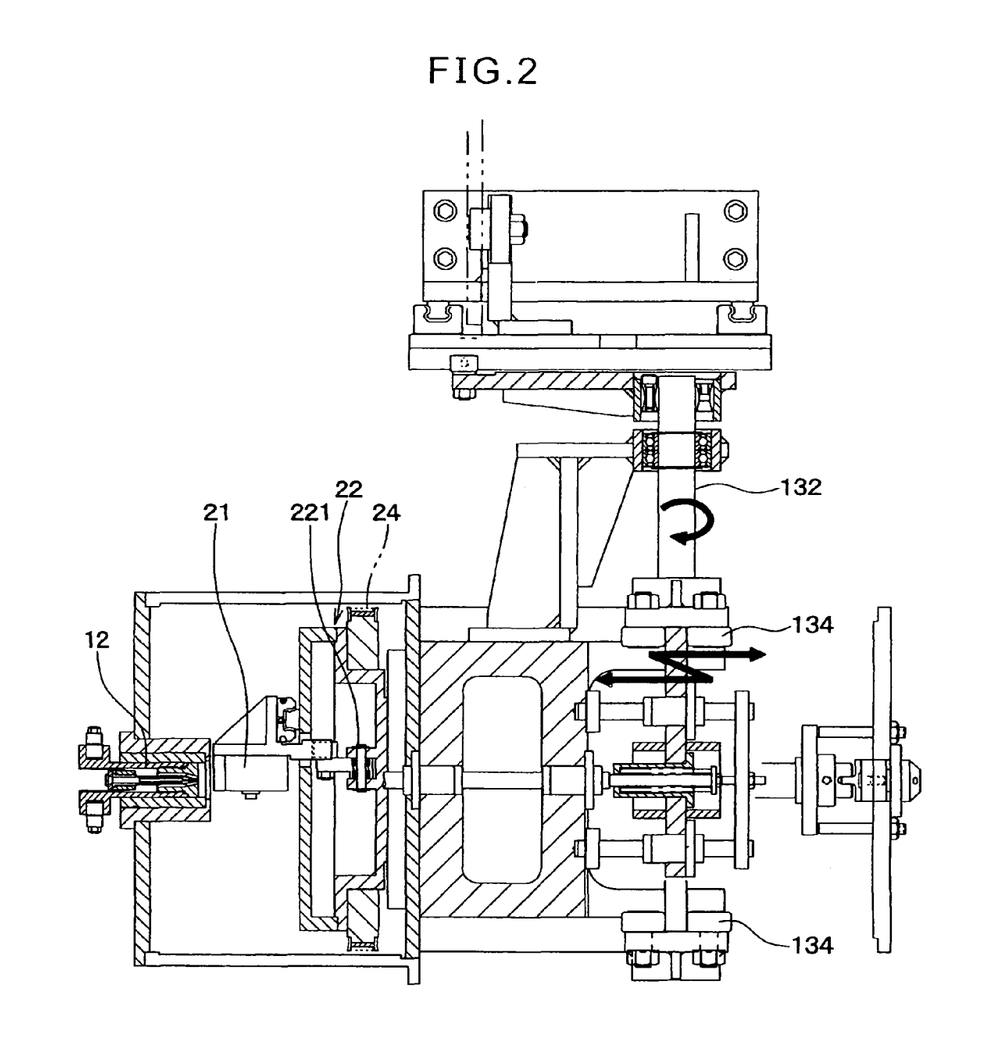
FIG. 2 is a top view of the wire stripping machine of FIG. 1.
Figure 3:
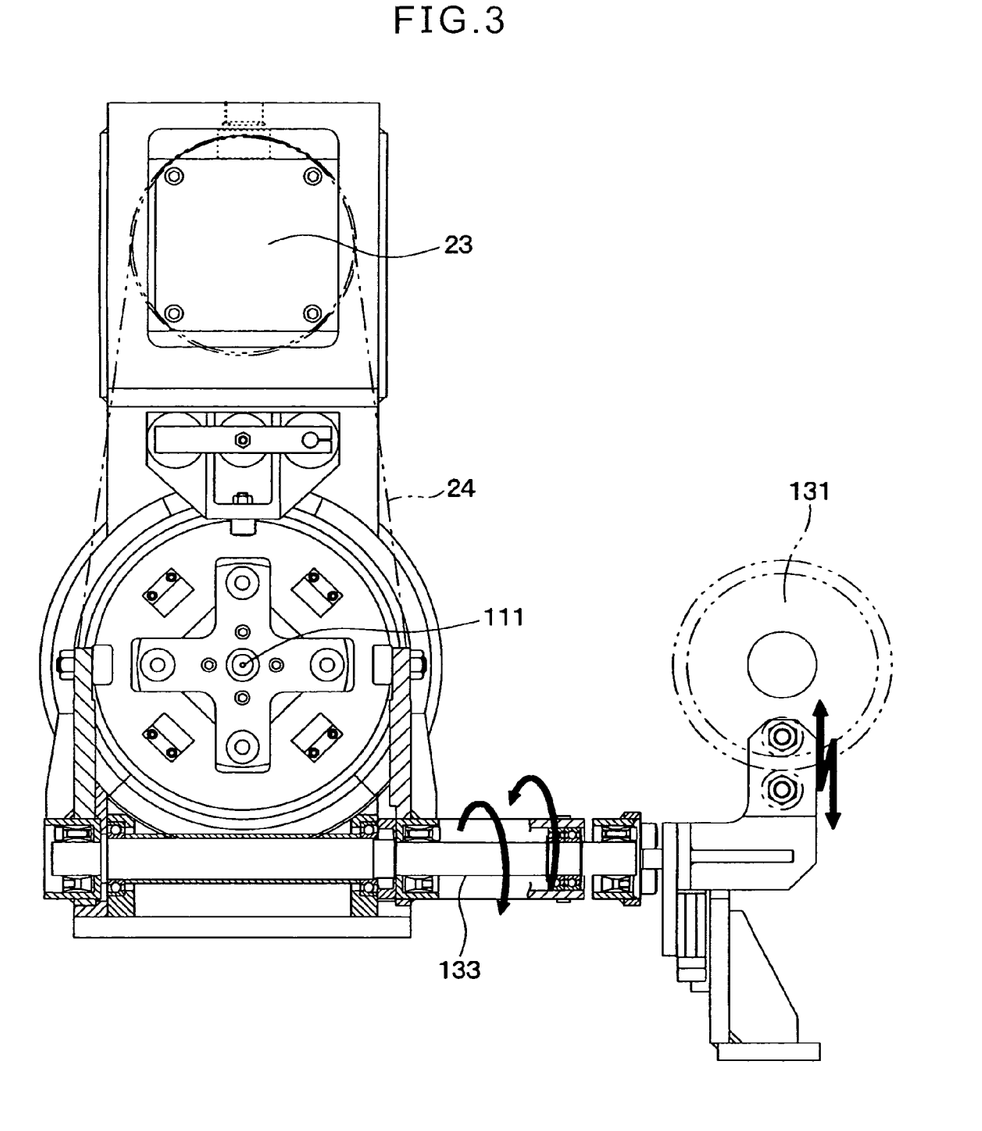
FIG. 3 is a side view of the wire stripping machine of FIG. 1.

FIG. 1 is a front view of a wire stripping machine according to the present embodiment, FIG. 2 is a top view of the wire stripping machine of FIG. 1 and FIG. 3 is a side view of the wire stripping machine of FIG. 1 seen from the right side of FIG. 1. Note that, in FIG. 1, part is a cross-sectional view.

The wire stripping machine in the present embodiment has a base part 10 on which a wire clamp part and a cutter part are assembled.

The wire clamp part has chucks 11, 12 and a chuck drive mechanism 13. The chucks 11, 12 for clamp mechanisms which hold (clamp) a wire 1 and are arranged separated by an interval of at least a stripping width Ws of the wire 1. In the present embodiment, as the chucks 11, 12, collet chucks are used, but the invention is not limited to this.

Wire 1 is introduced inside of the chucks 11, 12 through a wire introduction opening 111 (FIG. 1, FIG. 3) which is provided at the chuck 11 side (right side of FIG. 1).

The chuck drive mechanism 13 drives the chucks 11, 12 so that the chucks 11, 12 clamp and unclamp the wire 1. As the chuck drive mechanism 13, various configurations may be used, but in the present embodiment, it is configured so as to use the rotation of a single spindle cam 131 to pull in and return the collet chucks 11, 12. For example, shafts 132, 133 which rock in accordance with the rotation of the spindle 131 (FIG. 2, FIG. 3) and a cam follower 134 (FIG. 3) or other mechanical mechanism is used to pull in and return the collet chucks 11, 12.

As shown in FIGS. 1 and 2, the cutter part has a movable cutter part 21, cutter support part 22, and cutter rotating motor 23. The movable cutter part 21 is linked through the cutter support part 22 to the chuck 11.

The movable cutter part 21 is supported by the cutter support part 22 so as to be able to advance and retract in the radial direction of the wire 1 and abuts against the outer circumference of the wire 1 so as to cut the outer circumference of the wire 1 in the advancing state.

The cutter support part 22 forms a cutter driving means for advancing and retracting the movable cutter part 21. As the cutter support part 22, various configurations may be used, but in the present embodiment, the cutter support part 22 has a link mechanism 221 which is linked with the collet chuck 11. The link mechanism 221 is configured so that the movable cutter part 21 advances and retracts linked with the pull-in and return of the collet chuck 11. Further, the link mechanism 221 is linked through a bearing to the chuck 11 and can rotate with respect to the chuck 11.

The cutter rotating motor 23 is a cutter rotating means for rotating the movable cutter part 21 and cutter support part 22 in the circumferential direction of the wire 1 and, in the present embodiment, is configured by an electric motor. Further, in the present embodiment, the rotational drive force of the cutter rotating motor 23 is transmitted through a belt 24 to the cutter support part 22.

Figure 4:
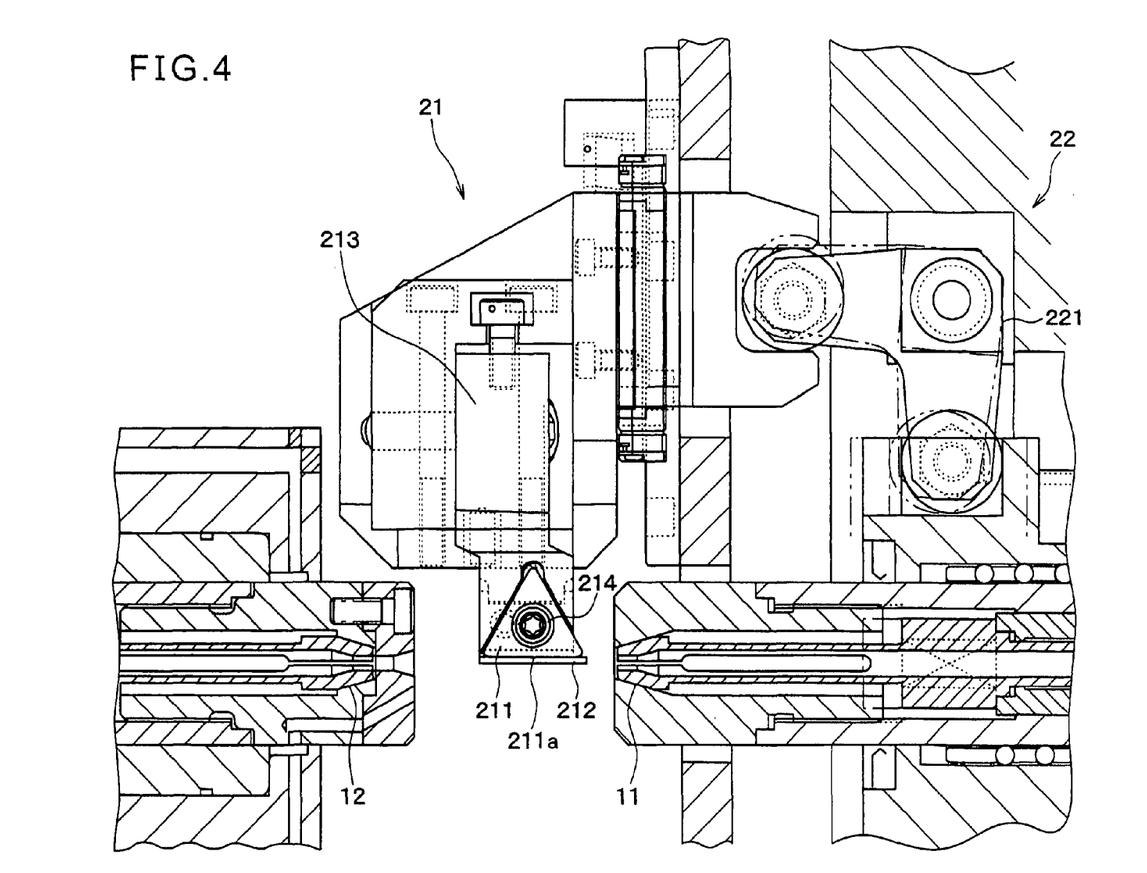
FIG. 4 is an enlarged view of a movable cutter part of FIG. 1 and locations near it.
Figure 5:
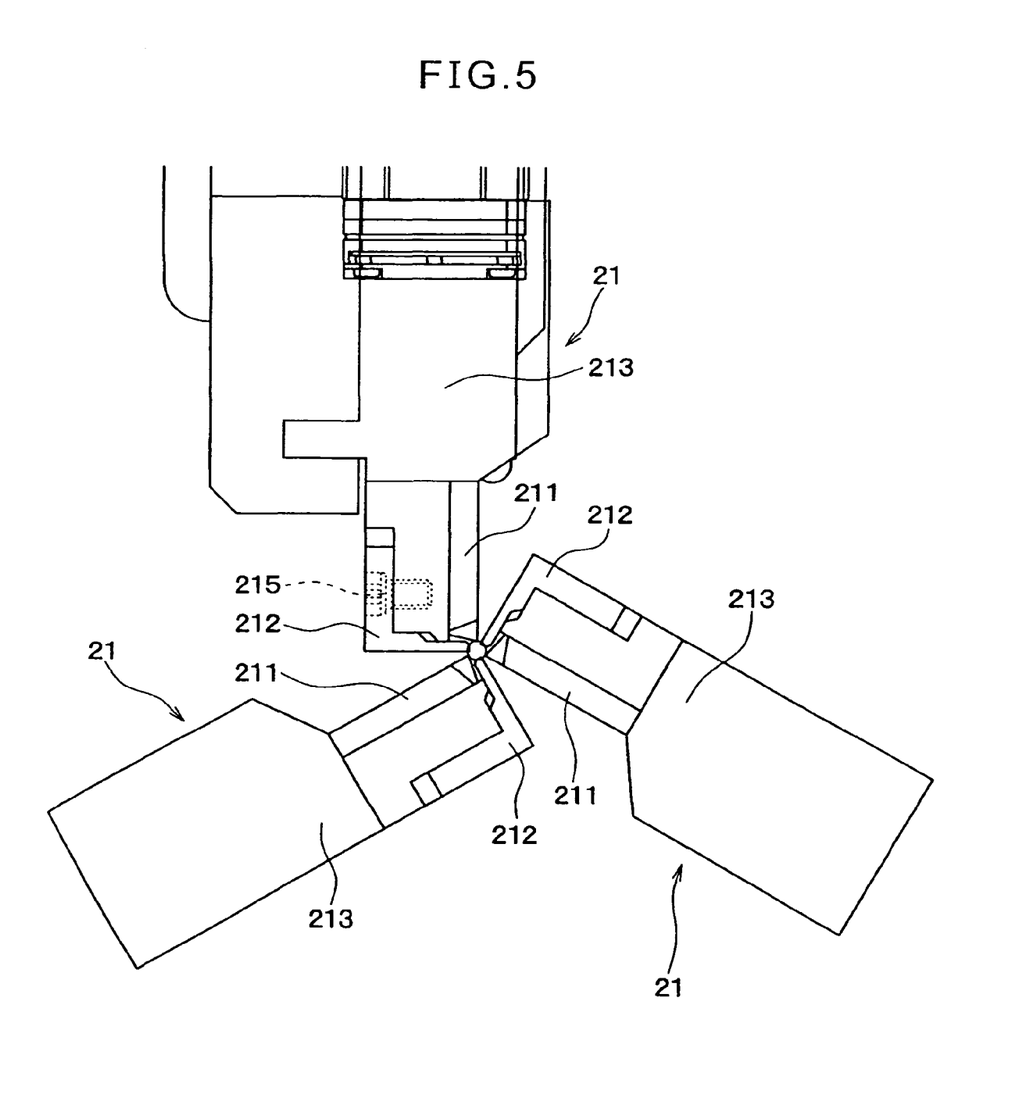
FIG. 5 is a side view of the movable cutter part of FIG. 4.

FIG. 4 is an enlarged view of the movable cutter part 21 of FIG. 1 and its nearly locations, while FIG. 5 is a side view of the movable cutter part 21 of FIG. 4 seen from the left side of FIG. 4.

As shown in FIG. 5, three (a plurality of) movable cutter parts 21 are provided, but in FIG. 4, for convenience in illustration, only one movable cutter part 21 is shown. The three movable cutter parts 21 have mutually the same structures and are arranged in the circumferential direction of the wire 1 at 120° intervals (equal intervals).

Each movable cutter part 21 has a cutter 211, wire support 212, and cutter head 213. Therefore, the machine as a whole is provided with three (the same plurality of) cutters 211, wire supports 212, and cutter heads 213. One of each of the cutters 211 and wire supports 212 are fixed to each cutter head 213.

The cutter 211 is a so-called throw-away tip. In the present embodiment, it has a triangular plate shape. One side of the triangle shape is formed with a cutting edge 211a. The width dimension of the cutting edge 211a is the same as the stripping width Ws of the wire 1 (FIG. 1). To suppress wear of the cutter 211, the cutting edge 211a may have a diamond tip adhered to it.

The cutter 211 abuts against a flat surface of the cutter head 213 at one of its plate surfaces and is fixed by bolts 214 (FIG. 4) to the cutter head 213.

The wire support 212 performs the role of receiving the outer circumference of the wire 1 and holding down the wire 1 from outside in the radial direction when the cutter 211 is cutting the outer circumference of the wire 1 and is fixed by bolts 215 (FIG. 5) to the cutter head 213.

In the present embodiment, the wire support 212 has a plate shape which is bent into an L-shape. One end part forms a receiving part which receives the outer circumference of the wire 1 while the other end portion is fixed to the surface of the cutter head 213 at the opposite side to the cutter 211.

The wire support 212 is fixed to the cutter head 213, so acts in the same way as the cutter 211. That is, if the cutter 211 rotates coaxially with the wire 1, the wire support 212 also rotates coaxially with the wire 1, while if the cutter 211 advances and retracts with respect to the wire 1, the wire support 212 also advances and retracts with respect to the wire 1.

Since, in the above way, the three movable cutter parts 21 have mutually same structures and are arranged in the circumferential direction of the wire 1 at 120° intervals, the three cutters 211 are arranged in the circumferential direction of the wire 1 at 120° intervals and the three wire supports 212 are arranged in the circumferential direction of the wire 1 at 120° intervals.

Figure 6:
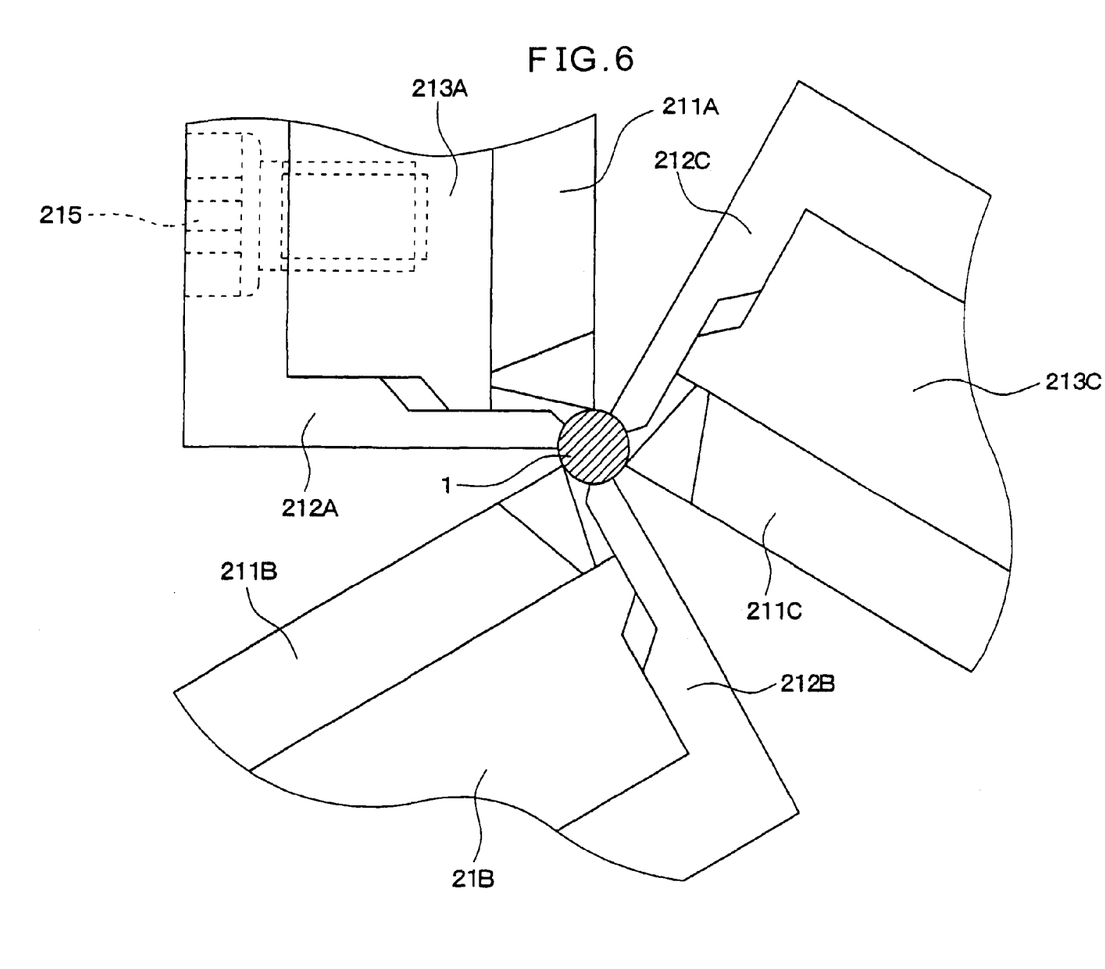
FIG. 6 is an enlarged view of principal parts of FIG. 5.

Each wire support 212 is arranged at a position facing, across the wire 1, one of the cutters 211 which is fixed to one of the cutter heads 213 which is different from the cutter head 213 to which it itself is fixed. The relative arrangement of the cutters 211 and wire supports 212 will be explained specifically based on FIG. 6. FIG. 6 is an enlarged view of principal parts of FIG. 5.

In FIG. 6, the three cutters 211 are designated as a first cutter 211A, second cutter 211B, and third cutter 211C, the three wire supports 212 are designated as a first wire support 212A, second wire support 212B, and third wire support 212C, and the three cutter heads 213 are designated as a first cutter head 213A, second cutter head 213B, and third cutter head 213C.

The first cutter head 213A has the first cutter 211A and first wire support 212A fixed to it. The second cutter head 213B has the second cutter 211B and second wire support 212B fixed to it. The third cutter head 213C has the third cutter 211C and third wire support 212C fixed to it.

The first wire support 212A is arranged between the first cutter 211A and second cutter 211B so as to face the third cutter 211C. The second wire support 212B is arranged between the second cutter 211B and the third cutter 211C so as to face the first cutter 211A. The third wire support 212C is arranged between the third cutter 211C and the first cutter 211A so as to face the second cutter 211B.

Figure 7:
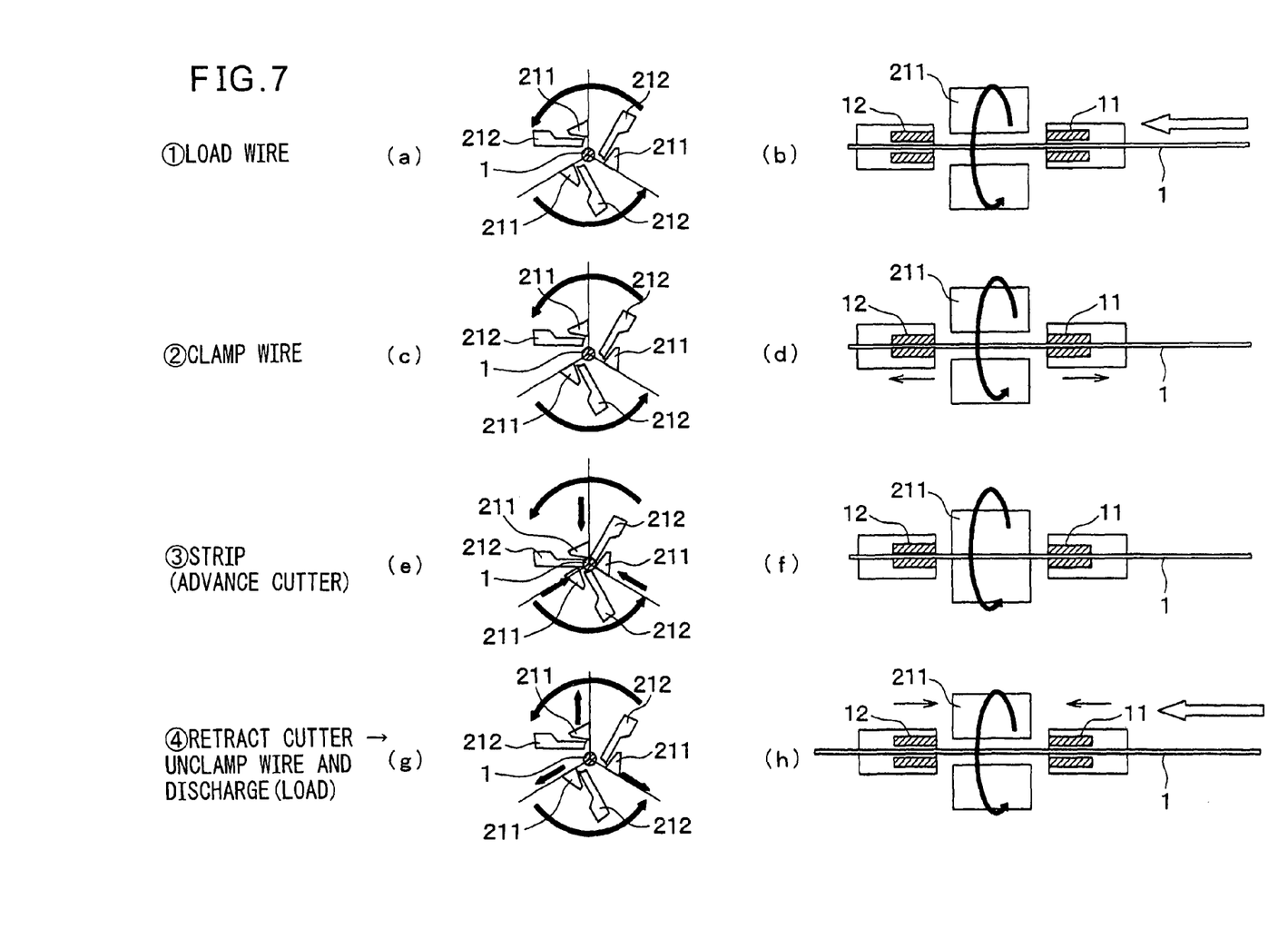
FIG. 7 is a view which explains the operation of the wire stripping machine according to the embodiment of the present invention.

Next, the operation in the above configuration will be explained based on FIG. 7. In FIG. 7, (a), (c), (e), and (g) are side views which schematically show cutters 211 and wire supports 212 in different operating states, while in FIG. 7, (b), (d), (f), and (h) are front views which schematically show cutters 211, wire supports 212, and chucks 11, 12 in different operating states.

First, in FIG. 7, (a) and (b) show the state where, due to operation of the cutter rotating motor 23, the cutters 211 and wire supports 212 rotate coaxially with the wire 1, in which the wire 1 is passed through the insides of the chucks 11, 12 (LOAD WIRE). Note that, the work of passing the wire 1 through the insides of the chucks 11, 12 may be performed by manual work by a worker or may be performed automatically by an apparatus which automatically feeds the wire.

Next, as shown in FIG. 7, (c) and (d), due to rotation of the spindle cam 131 (FIG. 1, FIG. 3), the chucks 11, 12 clamp the wire 1 (CLAMP WIRE). At the same time, as shown in FIG. 7, (e) and (f), the cutters 211 and wire supports 212 are advanced to the wire 1 (STRIP).

By the cutters 211 advancing to the wire 1, the cutters 211 rotate in the state contacting the outer circumference of the wire 1, so the outer circumference of the wire 1 is cut (cut into). At this time, the wire supports 212 also advance with respect to the wire 1, so the wire supports 212 push against the outer circumference of the wire 1.

Next, as shown in FIG. 7, (g) and (h), due to rotation of the spindle cam 131 (FIG. 1, FIG. 3), the cutters 211 and wire supports 212 are made to retract and the chucks 11, 12 are returned to as to unclamp the wire 1 (cutter retracted→wire unclamped and discharged).

Due to this, the wire 1 is discharged from the inside of the chucks 11, 12 whereupon the work of stripping the sheath from the wire 1 is completed.

By repeating the above operation, it is possible to continuously strip a sheath from the wire 1.

According to the present embodiment, as shown in FIG. 7, (e), when the cutters 211 cut into the outer circumference of the wire 1, the wire supports 212 push against the outer circumference of the wire 1 from the sides opposite to the cutters 211, so it is possible to keep the wire 1 from becoming off-centered and make the cutters 211 evenly strike the wire 1. As a result, it is possible to suppress the trouble of the sheath remaining after stripping (incomplete stripping) and the trouble of variations occurring in the diameter of the wire 1 after stripping (uneven stripping).

The cutters 211 maintain a state of constant continuous rotation while the cutters 211 are advanced (cutting and rotating) so as to strip the entire circumference of the wire 1. At this time as well, a bending load is received by the three evenly arranged wire supports 212, so it is possible to keep a bending load from directly acting on the wire 1.

In the present embodiment, the width direction of the cutting edge 211a of a cutter 211 is the same as the stripping width Ws of the wire 1, so it is possible to strip the wire without moving the cutter 211 in the longitudinal direction of the wire 1. Therefore, it is possible to shorten the stripping time.

Furthermore, in the present embodiment, the advancing and retracting operations of the cutters 211 (cutting operation) and the clamping/unclamping operation of the chucks 11, 12 (pull-in operation of collet chuck) are performed by drive force transmitted from a single spindle using a cam and synchronized, so the cutters 211 cut the wire at the same time as the clamping action by the chucks 11, 12 and the cutters 211 are retracted at the same time as the unclamping action by the chucks 11, 12. Therefore, continuous, high speed work is possible.

Other Embodiments

In the above embodiments, the cutter 211 is a triangular plate shape and the wire support 212 has a flat shape bent in an L-shape, but the invention is not limited to this. The specific shapes of the cutter 211 and wire support 212 may be modified in various ways.

Further, in the above embodiments, as a specific example of the wire 1 which is stripped by the wire sheath stripping machine, φ2 mm or so enamel coated copper wire which is used as a coil of an armature of a starter motor is mentioned, but the invention is not limited to this. The wire sheath stripping machine of the present invention can strip various covered wires.

While the invention has been described by reference to specific embodiments chosen for purposes of illustration, it should be apparent that numerous modifications could be made thereto by those skilled in the art without departing from the basic concept and scope of the invention.

The invention claimed is:

1. A wire sheath stripping machine comprising:
   a plurality of cutters for cutting an outer circumference of a wire;
   a cutter rotating means for rotating the cutter in a circumferential direction of the wire;
   a cutter driving means for advancing and retracting the cutter in a radial direction of the wire;
   a plurality of wire supports arranged at a position which faces the cutter across the wire to receive the outer circumference of the wire; and
   a plurality of cutter heads to which the cutter and wire support are affixed, wherein:
      said wire support is coupled with the cutter driving means so as to advance and retract in the radial direction of the wire while linked with the cutter,
      the cutter and the wire support are coupled with the cutter driving means through the cutter head,
      there is a same number of the pluralities of the cutters, wire supports and cutter heads, and
      each cutter head is fixed to one cutter and one wire support.

2. A wire sheath stripping machine as set forth in claim 1 further comprising a clamp mechanism for clamping the wire, wherein the cutter driving means has a link mechanism configured so that the cutter and wire support advance and retract in the radial direction of the wire while linked with the clamping/unclamping operation of the clamp mechanism.

3. A wire sheath stripping machine as set forth in claim 1, wherein each wire support faces, across the wire, one of the cutters which is fixed to one of the cutter heads which is different from the cutter head to which it itself is fixed.

4. A wire sheath stripping machine as set forth in claim 3, wherein the cutters are a first cutter, a second cutter, and a third cutter,
   the wire supports are a first wire support, a second wire support, and a third wire support, the cutter heads are a first cutter head, a second cutter head, and a third cutter head, the first cutter head has the first cutter and the first wire support fixed to it, the second cutter head has the second cutter and the second wire support fixed to it, the third cutter head has the third cutter and the third wire support fixed to it, the first wire support is arranged between the first cutter and the second cutter so as to face the third cutter, the second wire support is arranged between the second cutter and the third cutter so as to face the first cutter, and the third wire support is arranged between the third cutter and the first cutter so as to face the second cutter.

5. A wire sheath stripping machine as set forth in claim 1, wherein the width dimension of a cutting edge of the cutter is the same as a stripping width of the wire.

* * * * *